UNITED STATES PATENT OFFICE 2,280,147

PREPARATION OF EGG PRODUCTS

Norman C. Fischer, Springfield, Mo., assignor to Armour and Company, Chicago, Ill., a corporation of Illinois No Drawing. Application July 31, 1939,
Serial No. 287,622

13 Claims. (Cl. 99—210)

This invention relates to the production of dried egg whites and deals particularly with the treatment of the egg whites prior to drying in order to improve the quality of the dried product.

Dried egg whites are now being used in increasing amounts in baking, candy manufacture, etc., and the extent of such use seems to be limited only by the ability of the manufacturer to make a high quality product which when reconstituted will whip readily with a stable foam of large volume, which has good odor and color characteristics, and which has substantially all the qualities of the fresh egg whites. It is well known that untreated fresh egg white when dried will not whip well when again reconstituted, and treatment of some kind is necessary.

One of the oldest methods used in preparing dried egg whites is known in the trade as the Chinese method. This process involves first straining the whites through a fine screen and then permitting the strained whites to stand until fermentation has taken place which takes something like two to four days at room temperature. As fermentation continues a scum rises to the surface and a sediment is formed. The scum is skimmed off and the sediment removed, and thereafter the whites are dried by the pan method or by spraying. The product obtained by this method whips well when reconstituted but is objectionable because of its taste and odor characteristics. The objectionable taste and odor have heretofore been laid to the changes taking place in the material upon fermentation, and the art has previously sought to avoid fermentation and obtain the desired whipping qualities by some other expedient.

An escape from the fermentation step was found in the addition of acid to the fresh egg whites prior to drying, and methods of treatment employing acid are disclosed in Fischer Patents Nos. 1,996,800 and 1,996,801, Rosner Patent No. 2,059,399, and McCharles et al. No. 2,087,985. Upon the addition of acid a reaction takes place which reduces the viscosity of the egg whites and permits of drying after the reaction has been completed. By these methods fermentation is avoided and the reconstituted product has good odor and will whip to some degree. However, in actual practice the foam to be obtained from the product of these methods has never been equivalent in volume or stability to that obtained from fresh egg whites or from whites dried by the Chinese method. Furthermore, the dried egg whites prepared by these methods have a yellow to brownish color and this color darkens with age. This objection as to color is serious since one of the principal reasons for drying the egg products is to preserve the natural qualities of the whites during storage and shipment, and the darkened color of the stored egg whites renders them practically unsaleable.

I have discovered that by going back to the older fermentation process it is possible to modify the action of the organisms to eliminate the undesirable odor previously thought inherent in this kind of process. I have found that not all of the organisms active in fermentation contribute to the formation of objectionable color and odor, and that the activity of the odor forming organisms can be restricted by adding acid to the egg whites prior to fermentation. By adding the acid I produce a condition which is unfavorable to the action of certain odor forming organisms, while still permitting the full activity of other organisms which yield good whipping qualities. I have also found that in my improved process where fermentation takes place under conditions favorable only to acid forming bacteria the objectionable tendency of the dried product to darken on aging has been completely eliminated. In this way I am able to produce a product which has all the foam producing characteristics of the Chinese product without any objectionable odor or taste and without any tendency to change color.

This improved process must be distinguished from the process of previous patents and the other art above referred to wherein acid is used as a substitute for fermentation. It will be understood that in the present process the acid condition is employed as a control of fermentation.

This invention also includes improved ways of utilizing and handling the scum and other insolubles involved in the process. These features will become more apparent after a more detailed description of the improved procedure.

As an example of carrying out the improved process, a large vat may be filled with 15,000 pounds of fresh egg whites. To this is added 102 pounds of hydrochloric acid of 37.0–38.5 per cent concentration diluted with 4 to 5 parts of water. The acid may be added through a tube, the egg whites being stirred as with a paddle to distribute the acid throughout the mass and prevent local action at any particular portion of the mass. The agitation is more conveniently accomplished by means of a motor driven propeller type agitator, but any means of agitation may be used. The acid may be added over a period of about 20 minutes, and the agitation then continued. The fresh egg whites are quite viscous and it will in fact be found that in the initial stages of hydrolysis by the acid, the material becomes even more viscous, reaching a maximum viscosity in about 15 minutes after the acid has been added. Thereafter the viscosity of the material decreases and after about one hour the hydrolysis will be substantially complete and the viscosity of the mass will be substantially that of water.

Soon after the addition of the acid a scum will begin to form on top of the local mass, and this scum consists probably of certain kinds of insolubles such as chalaza and stringy portions of the egg white, and a certain amount of foam. It is desirable to keep the foam down to a minimum, and for this reason the continued agitation should not beat the surface of the mass or produce too much surface agitation. Under specific conditions of operation I have found that the depth of the scum layer reached a maximum in about two hours after the addition of the acid. After reaching its maximum the scum then begins to go back into suspension within the mass and the foam disappears. Within about six or eight hours under continuous agitation it will be found that all of the scum layer is dispersed throughout the mass and is circulating within the mass.

Agitation is then continued during the fermentation period to maintain the insolubles in suspension and prevent settling. The length of time necessary for fermentation to take place may vary considerably, depending largely on the temperature of the egg material. For a normal room temperature of about 72° F., I prefer to allow about 96 hours for fermentation to take place, but longer or shorter periods can be used to advantage. Generally the length of the period required will be between 60 and 120 hours. My invention includes any length of period which under the temperature conditions employed would produce fermentation independently of acid action sufficient to enable whipping of the reconstituted product, and in the appended claims the terms "extended fermentation" will be used to designate fermentation which proceeds to this extent. I have found that a fermentation period of 40 hours at 74° F. will not yield the necessary amount of fermentation, and in general lower temperatures require longer fermentation periods while higher temperatures require shorter periods.

When the fresh egg whites are placed in a vat they are usually in cooled condition, usually about 45 or 55° F., and I find it advantageous to add the necessary acid while the whites are in this cooled condition. By adding the acid while the egg whites are in cooled condition the acid reaction takes place more slowly and there is less likelihood of objectionable local action at any portion of the egg white mass. After the addition of the acid the temperature of the egg white mass may then be raised to normal room temperature or possibly higher if desired, and the remainder of the process carried on at this new temperature.

After fermentation the egg material is dried preferably in a spray drier. The insoluble material, having been maintained in suspension within the mass during fermentation, will be dried along with the rest of the product while still in suspension, and the presence of this insoluble material contributes to the high quality of the dried product.

Though in the foregoing example hydrochloric acid is specified, other acids such as lactic and citric may be used. The amount of acid added may also vary, though I prefer to add sufficient acid to reduce the pH of the material to about 5 or 5.2. However, the process may be practiced to advantage when the pH is adjusted to values below 6.0.

It is my belief that the beneficial control of fermentation by the added acid is due to the fact that this acid condition is unfavorable to the action of proteolytic enzymes and that decomposition through proteolytic action is consequently prevented. In ordinary fermentation processes the proteolytically active bacteria and the acid-forming bacteria work each in relation to the activity of the other. In this situation the acid-forming bacteria first increase in number out of proportion to the proteolytic type, but during the latter stages of fermentation the acid-forming bacteria decrease in number and the proteolytic type increase very rapidly. It is believed that the addition of acid restricts the action of the proteolytic bacteria, thus preventing breakdown into amino acids and decomposition products, this effect having its benefit particularly towards the end of the fermentation period. The proteolytic enzymes are active at a pH between 6 and 7, and in the improved process a pH below 6 is recommended. By the addition of acid all those organisms requiring a neutral or alkaline medium are eliminated, and this control over the fermentation process is believed to be responsible for the higher quality product obtained.

Also many of the benefits derived from the improved process are believed to be due to the restriction of anaerobic bacterial action during fermentation. I have found that anaerobic bacteria produce end products of objectionable taste and odor. This type of bacteria is most active in a slightly alkaline medium, and by reducing the pH of the egg whites, the egg white medium is made substantially less favorable to the anaerobic bacteria. Also the acid condition of the egg white material operates to prevent the combination of reducing substances with available oxygen during fermentation, thus providing, through the presence of oxygen, a condition less favorable to anaerobic bacteria. It will be apparent that the advantage to be gained through control of anaerobic bacteria during fermentation is obtained wherever sufficient acid is added to reduce the pH of the egg whites below 7.0. However, this advantage also is more pronounced when the pH is reduced below 6.0.

As a further explanation of the improved results obtained I believe that fermentation under conditions favorable only to acid tolerant bacteria cause the reducing sugar naturally in egg albumen to diminish or disappear. This is believed to be highly important for producing a product of good color stability, since reducing sugar is probably responsible for the yellow to brownish color which becomes darker with age.

Previously it has always been thought that the insoluble material must be separated off and removed from the material fermented. It is true that such material when segregated presents a medium more favorable to the objectionable bacteria, but I have found that by keeping such insolubles constantly in suspension throughout fermentation no objectionable bacterial action takes place in the particles of insoluble substances. The separation of scum at the top of the material at the beginning of the process seems unobjectionable since this is distributed into the egg mass by the time fermentation has begun.

Though I have set forth what is believed to be the true explanations of the improved results obtained by my process, I do not wish to be understood as disclaiming any part of the invention should it later be found that the advantages obtained are best explained by some other theory.

Though I have mentioned specific ways of carrying out the various steps of the process, it will be understood that other specific ways may be employed, and various changes and modifications may be made in the practice of the process without departing from the spirit of the invention. The foregoing detailed description has been given for purposes of explanation only, and no unnecessary limitations should be understood therefrom.

I claim:

1. The process of treating egge whites comprising acidifying the egg whites, subjecting the acidified egg whites to extended bacterial fermentation, and drying the fermented egg white material.

2. The process of treating egg whites comprising adjusting the pH of the egg whites to a point less favorable to proteolytically active organisms than the pH of the fresh egg whites, then subjecting the egg whites to extended bacterial fermentation, and drying the fermented egg white material.

3. In the treatment of egg whites preparatory to drying, the steps of adjusting the pH of the egg whites to from 5 to 6, subjecting the whites thus treated to extended bacterial fermentation, and drying the fermented egg whites.

4. A process of treating egg whites comprising adding an acid to the egg whites whereby insolubles are caused to form in a top layer of the egg white material, subjecting said material to agitation to disperse said insolubles and bring them into suspension within the mass of the material, maintaining said insolubles thus in suspension during a bacterial fermentation step, and drying the fermented egg material.

5. A process of treating egg whites comprising adding an acid to the egg whites while agitating the whites to disperse the acid whereby insolubles are caused to separate and form a top layer, continuing agitation of said material until substantially all of said insolubles are held in suspension within the mass of said material and until bacterial fermentation of the material has taken place, and then drying the fermented egg white material.

6. The process of treating egg whites comprising adjusting the pH of the egg whites less favorable to proteolytically active organisms than the pH of the original egg whites, then holding the egg whites for from 60 to 120 hours during which bacterial action takes place within said egg white material and thereafter drying said material.

7. The process as in claim 6 wherein the egg whites are permitted to stand at temperatures at least as high as normal room temperature.

8. A process of treating egg whites comprising adding acid to the egg whites to obtain a pH of from 5 to 6 while agitating the whites, continuing agitation of the egg whites until hydrolysis has taken place and until substantially all insoluble material is distributed throughout the mass and held in suspension therein, holding said mass extended until bacterial fermentation has taken place while maintaining said insolubles in suspension within the mass, and drying the fermented egg white material while said insolubles are still in suspension.

9. The process of treating egg whites comprising acidifying the egg whites, subjecting the acidified egg whites to bacterial fermentation at a temperature higher than the temperature at which they were acidified, and drying the fermented egg white material.

10. In the treatment of egg whites preparatory to drying the steps of adding acid to the egg whites while said whites are at a relatively low temperature, and subjecting the acidulated whites to bacterial fermentation at a relatively high temperature at least as high as room temperature.

11. In a process for treating egg whites wherein insolubles within the egg white material form in an agglomerated mass separate from the main body of the material, the steps of agitating said material to disperse said insolubles and bring them into suspension within the material, maintaining said insolubles thus in suspension during bacterial fermentation of the egg whites, and drying the fermented egg white material.

12. A process of treating egg whites comprising adding an acid to the egg whites whereby insolubles are caused to separate from the remainder of the egg white material, subjecting said material to agitation to disperse said insolubles and bring them into suspension within the mass of the material, subjecting said material including said insolubles to extended bacterial fermentation, and drying the fermented egg material.

13. A process of treating egg whites comprising subjecting the egg whites to hydrolysis whereby the viscosity of the whites is reduced to substantially that of water and insolubles are caused to separate from the remainder of the egg white material, subjecting said material to agitation to disperse said insolubles and bring them into suspension within the mass of the material, subjecting said material including said insolubles to extended bacterial fermentation, and drying the fermented egg material.

NORMAN C. FISCHER.